(12) United States Patent
Maranville et al.

(10) Patent No.: US 7,823,708 B2
(45) Date of Patent: Nov. 2, 2010

(54) MAGNETORHEOLOGICAL DAMPING DEVICE FOR REDUCTION OR ELIMINATION OF VIBRATION IN STEERING SYSTEMS

(75) Inventors: Clay Maranville, Ypsilanti, MI (US); Dieter Giese, Dearborn, MI (US); John Ginder, Plymouth, MI (US); Joe Schmidt, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1400 days.

(21) Appl. No.: 11/265,343

(22) Filed: Nov. 2, 2005

(65) Prior Publication Data
US 2007/0137955 A1 Jun. 21, 2007

(51) Int. Cl.
*F16F 15/03* (2006.01)
(52) U.S. Cl. .................... 188/267; 188/267.1
(58) Field of Classification Search ............ 74/574, 74/573 F; 188/267, 267.1, 267.2; 280/779
See application file for complete search history.

(56) References Cited

U.S. PATENT DOCUMENTS

| | | | |
|---|---|---|---|
| 4,239,092 A | 12/1980 | Janson | |
| 5,678,460 A | 10/1997 | Walkowc | |
| 5,794,508 A | 8/1998 | Gerigk | |
| 5,829,319 A * | 11/1998 | Mokeddem | 74/574.1 |
| 6,095,295 A * | 8/2000 | Park et al. | 188/267.2 |
| 6,120,046 A | 9/2000 | Daly | |
| 6,164,689 A | 12/2000 | Rivin et al. | |
| 6,508,480 B2 | 1/2003 | Smith, Jr. et al. | |
| 6,547,043 B2 | 4/2003 | Card | |
| 6,637,558 B2 | 10/2003 | Oliver et al. | |
| 6,659,218 B2 | 12/2003 | Thomas et al. | |
| 6,662,912 B2 | 12/2003 | Smith, Jr. et al. | |
| 6,679,508 B2 | 1/2004 | Smith, Jr. et al. | |
| 6,679,598 B2 | 1/2004 | Smith, Jr. et al. | |
| 6,681,883 B2 | 1/2004 | Loh et al. | |
| 6,752,425 B2 * | 6/2004 | Loh et al. | 280/779 |
| 6,789,651 B2 | 9/2004 | Ogura et al. | |
| 6,960,024 B2 * | 11/2005 | Robb et al. | 384/536 |
| 7,306,535 B2 * | 12/2007 | Menjak et al. | 475/29 |
| 2003/0085086 A1 * | 5/2003 | Oliver et al. | 188/267.1 |
| 2004/0054455 A1 | 3/2004 | Voight et al. | |
| 2006/0059905 A1 * | 3/2006 | Namuduri | 60/445 |
| 2007/0023244 A1 * | 2/2007 | Carlson et al. | 188/267 |
| 2007/0289837 A1 * | 12/2007 | Wheals | 192/84.81 |

* cited by examiner

*Primary Examiner*—Christopher P Schwartz
(74) *Attorney, Agent, or Firm*—O'Brian Jones, PLLC

(57) ABSTRACT

A damping device for use with a rotatably-mounted steering shaft. The damping device comprises a magnetorheological material that can be embedded in an open-network carrier and is directly or indirectly in contact with the steering shaft, a coil arranged in effective proximity to the magnetorheological material, and a body indirectly in contact with the steering shaft through the magnetorheological material, which does not rotate with the steering shaft. A voltage can be applied the coil to activate the magnetorheological material, increasing a viscosity of the magnetorheological material to inhibit relative rotation of the steering shaft and the body.

20 Claims, 5 Drawing Sheets

MAGNETORHEOLOGICAL DAMPING DEVICE FOR REDUCTION OR ELIMINATION OF VIBRATION IN STEERING SYSTEMS

BACKGROUND OF THE INVENTION

1. Field of Invention

This invention relates to the field of damping torsional vibration. More specifically, this invention relates to a device for controlling vibration in a vehicle steering system using a magnetorheological damper.

2. Background

Automotive vehicle steering systems are subject to a large number of forces that may cause vibrations that are felt by the driver through the steering wheel. These undesirable steering wheel vibrations, commonly known as nibble and wheel fight, may be caused by road surface artifacts such as potholes or washboard dirt road surfaces, and vehicle dynamic events such as braking (brake roughness and braking torque), tire/wheel imbalance, or similar forces caused by tire construction. Nibble is a problem to varying degrees in a wide variety of vehicles, and can occur while driving on smooth roads at steady state conditions. Nibble can lead to customer dissatisfaction and may cause premature deterioration of vehicular components.

Nibble in vehicle steering systems has been exacerbated by recent developments in rack and pinion steering gears and other measures taken to reduce friction in vehicle steering systems and thereby improve vehicle handling. Nibble has also been exacerbated by customers' desire for larger diameter wheels and tires, which create larger forces.

One way to reduce nibble is to dampen it by increasing friction in a vehicle's steering system. However, higher unmodulated friction in steering systems can lead to imprecise steering. Current nibble countermeasures employed by vehicle manufacturers, including tuned dampers, only dampen at predefined frequencies of vibration and therefore require very careful matching of damper-tuned resonance to the system resonance to be controlled. In addition, these countermeasures require balancing of a vehicle's wheel/tire assembly during production.

Nibble can occur over a range of frequencies (e.g., 10-20 Hz) that generally correlate with the rotational speed of the tires. Further, identical vehicles can have different levels of nibble response. Depending on the frequency and the amplitude, vibrations can be mild to annoying. Thus, nibble can cause a reduction in customer satisfaction and increased warranty costs.

Conventional damping devices used for nibble mitigation utilize tuned dampers that work by removing energy from the steering system in a frequency range to which they are tuned. These dampers can be located in the steering wheel or attached to the steering shaft. They often comprise inertial masses that are suspended by springs or elastomeric compounds, such as the device disclosed in U.S. Pat. No. 6,614,689. This type of device has some drawbacks. For example, tuned dampers are typically tuned to a single frequency and cannot remove energy at other frequencies. Tuned dampers may even increase vibration at other frequencies. Thus, for tuned nibble dampers, if the vibration frequency shifts or occurs out of the range of the tuned damper, the damper is no longer effective. Frequency shifts can occur due to vehicle aging.

In addition, tuned dampers add weight and inertia to a vehicle steering system, which has a detrimental effect on vehicle steering and handling. The effectiveness of tuned dampers is limited by the amount of mass that can be used due to packaging constraints (i.e., the amount of available space for the mass, based on the vehicle's design). Further, many tuned dampers are not very effective for small amplitude vibrations, such as those characteristic of nibble. Tuned dampers are less effective for small amplitude vibrations due to the viscoelastic response of the elastomers used in the springs of tuned dampers.

Some conventional steering wheel vibration suppression devices utilize hydraulic or viscosity control of fluids. These designs can be costly and complicated to manufacture and assemble into vehicles, and often are subject to the same drawbacks as tuned dampers.

Magnetorheological (MR) dampers enable electrical control of torque transfer and rotational slip, in addition to control of the level of static and dynamic frication between two fixed surfaces. MR dampers typically use MR fluids, which commonly comprise slurries of 2 to 5 micron particles suspended in oil or other suitable carriers, such as water. As magnetic fields are applied to MR fluid, the particles tend to form chains that are capable of carrying torque proportional to the magnetic field.

Some disclosed MR damper configurations utilize MR fluid that is retained in the device with seals. The sealing of fluids can be costly and prone to leakage.

BRIEF SUMMARY OF THE INVENTION

In one embodiment, the invention is directed to a damping device for use with a rotatably-mounted steering shaft. The damping device comprises a magnetorheological material embedded in an open-network carrier and directly or indirectly in contact with the steering shaft, a coil arranged in effective proximity to the magnetorheological material, and a body indirectly in contact with the steering shaft through the magnetorheological material, which does not rotate with the steering shaft. A voltage can be applied to the coil to activate the magnetorheological material, increasing a viscosity of the magnetorheological material to inhibit relative rotation of the steering shaft and the body.

In another embodiment, rather than being embedded in an open-network carrier, the MR material has rheological behavior such that seals are not needed to contain the MR material. The body is fixed external to the steering shaft so that it does not rotate with the steering shaft. The device further comprises a flux carrier in effective proximity to the coil. A sleeve extends at least partially around the steering shaft and acts as a flux return path. The sleeve and the flux carrier are positioned relative to the coil and relative to each other to make the magnetic field pass perpendicularly through the magnetorheological material. The magnetorheological material can be formed into a cylindrical band surrounding the steering shaft, and comprises magnetizable particles suspended in a suitable carrier.

In another embodiment, the damping device comprises a housing at least partially surrounding the steering shaft that does not rotate with the steering shaft, a coil and a flux carrier fixedly attached to the housing at a radially outer position, and a magnetorheological material extending between the coil and the steering shaft. A voltage can be applied to the coil to activate the magnetorheological material, increasing the viscosity of the magnetorheological material to inhibit rotation of the steering shaft. Seals are not needed to contain the MR material.

In yet another embodiment, the invention is directed to a method for damping vibrations in a rotatably-mounted steering shaft. The method comprises embedding a magnetorheological material in an open-network carrier and directly or indirectly placing the magnetorheological material in contact with the steering shaft, arranging a coil in effective proximity to the magnetorheological material, providing a body that does not rotate with the steering shaft, and which is in contact with the steering shaft through the magnetorheological material, and applying a voltage to the coil to activate the magnetorheological material, increasing a viscosity of the magnetorheological material to inhibit relative rotation of the steering shaft and the body.

Further features of the present invention, as well as the structure of various embodiments of the present invention are described in detail below with reference to the accompanying drawings.

BRIEF DESCRIPTION OF THE DRAWINGS

The accompanying drawings, which are incorporated herein and form part of the specification, illustrate the present invention and together with the description, further serve to explain the principles of the invention and to enable a person skilled in the pertinent art to make and use the invention. In the drawings, like reference numbers indicate identical or functionally similar elements.

DETAILED DESCRIPTION OF THE INVENTION

The present invention utilizes vibration control and mechanical behavior of magnetorheological (MR) fluids to dissipate vibration energy in a vehicle steering system caused by vibration from loads such as brakes, wheels, tires, and or the road. Other uses of the invention include aircraft, watercraft, and large machinery such as construction equipment. Indeed, the invention can be applied to any device that has a steering shaft subject to undesirable rotational vibrations.

The properties of MR fluids are discussed in U.S. Pat. No. 6,752,425, the disclosure of which is incorporated herein by reference. MR fluids in general exhibit Newtonian behavior and can be used to produce damping. The yield strength of an MR material increases with the application of a magnetic field. If MR fluid is placed in a gap between two moving plates and a magnetic field is applied, a shear stress distribution results within the MR fluid. The total shear force between the moving plates and the MR fluid acts in the direction opposite to the motion of the plates. This total shear force is the product of the MR fluid shear stress and the contact area of the plates. This shear force provides damping to inhibit movement of the plates. Thus, in order to maximize the damping produced by the MR fluid, one key factor is maximization of the interface between the MR fluid and the contacting mechanical parts (i.e., the plates).

According to the invention, a device is preferably mounted concentrically around the vehicle's steering shaft, within the vehicle's steering column. A body comprising a portion of the device does not rotate with the steering column, preferably because it is fixedly mounted to the steering column, the front bulkhead, or another stationary part of the vehicle to prevent its rotation. The invention also contemplates a body that is not fixedly mounted, but that rotates or moves independently of steering column rotation. The body comprises, for example, a bracket, housing, or other structure, and may, for example, extend adjacent to the steering shaft or surround the steering shaft. MR material fills a gap between the device and the steering shaft. The device also includes a coil to form an electromagnet to control the viscosity of the MR material.

Figure 1:
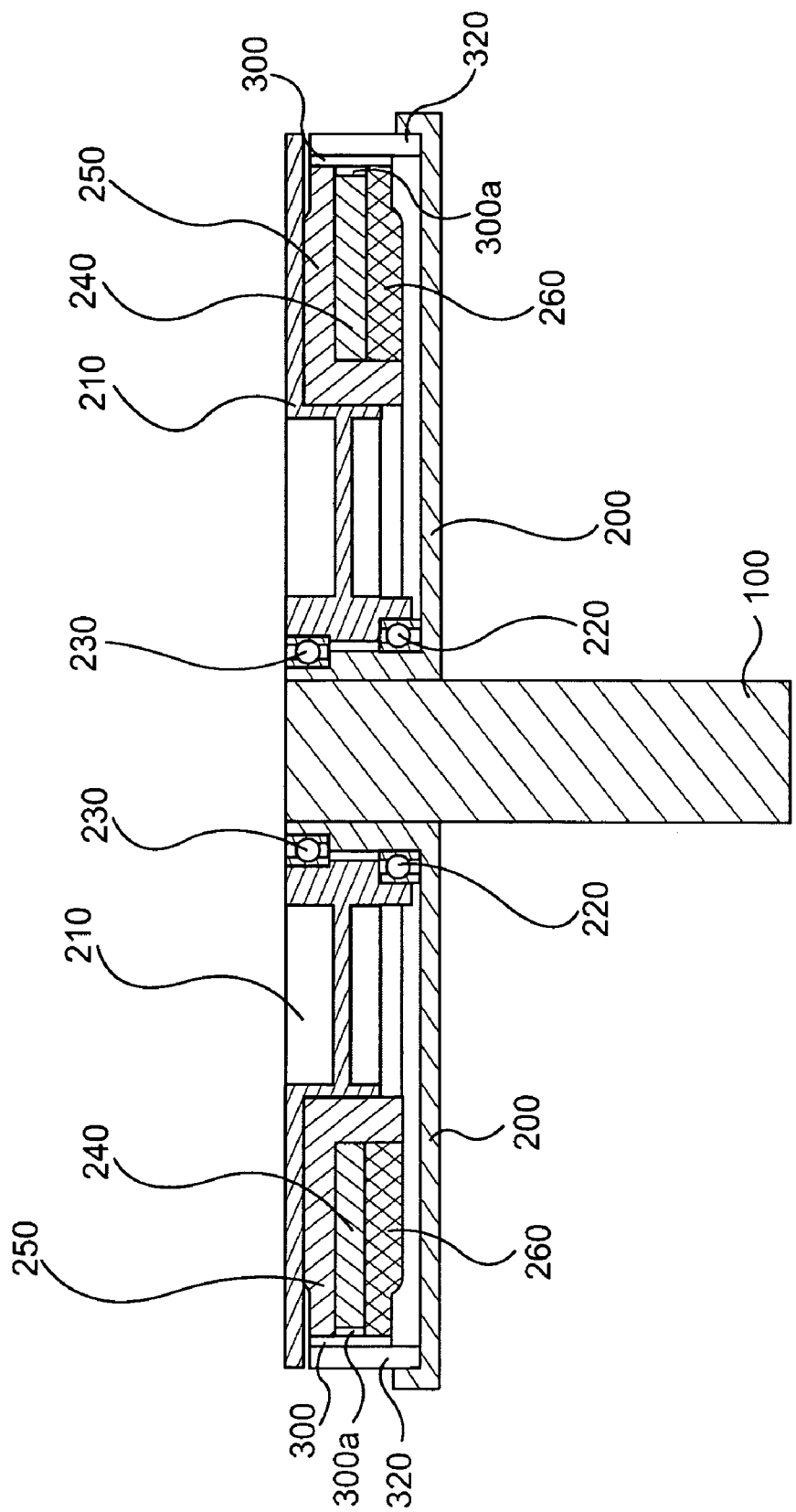
FIG. 1 illustrates a cross-sectional view of one embodiment of the invention.
Figure 2:
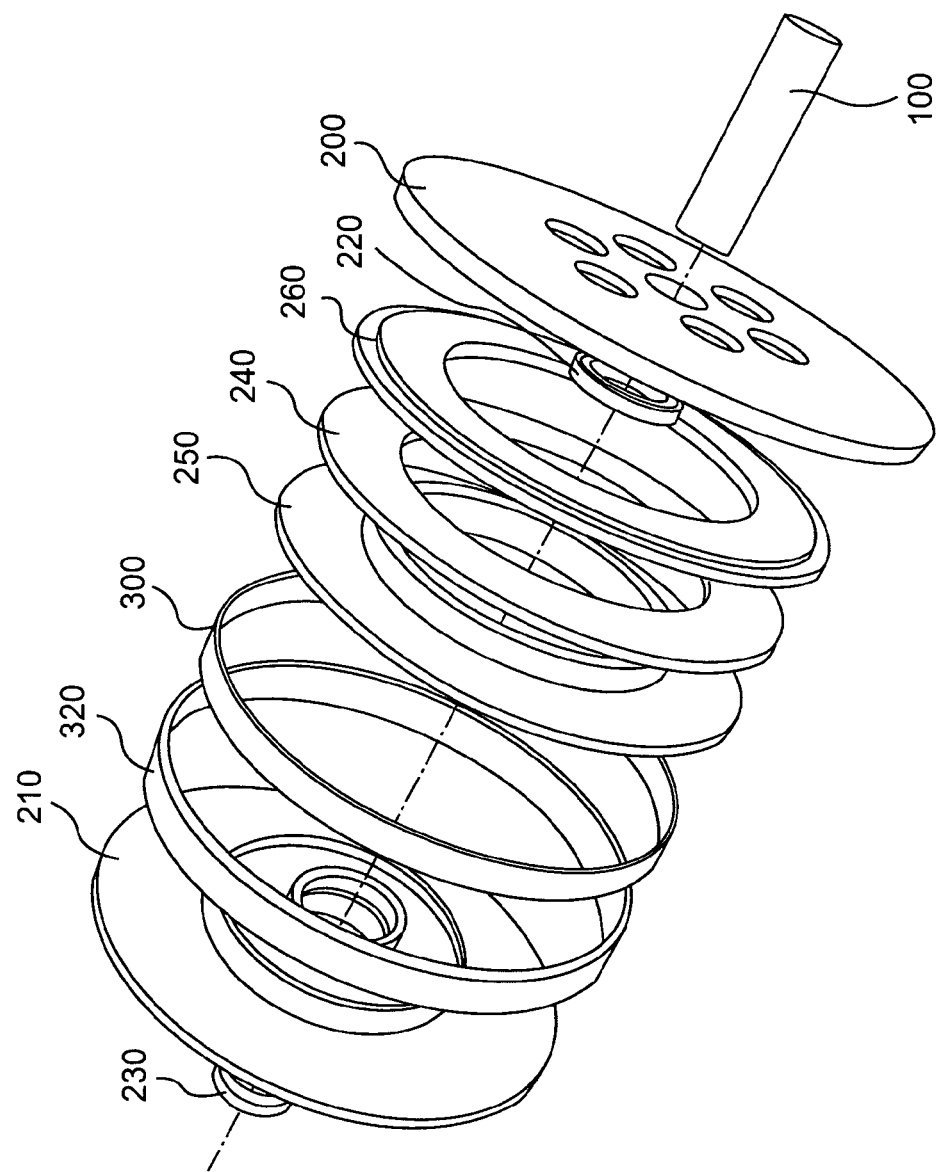
FIG. 2 illustrates an exploded view of the embodiment of FIG. 1.

One embodiment of the invention is illustrated in FIGS. 1 and 2. As shown in FIG. 1, a bracket 200 is fixedly mounted to a steering shaft 100 of a vehicle. The bracket 200 preferably comprises a metal such as aluminum. A housing 210 is fixedly mounted to a non-rotating portion of the vehicle, for example to the firewall of the vehicle (not shown). As a result, as the steering shaft 100 rotates, the housing 210 maintains a fixed position such that the bracket 200 rotates relative to the housing 210. The housing 210 preferably comprises a non-ferrous metal such as aluminum. To facilitate the relative rotation of the bracket 200 and the housing 210, bearings 220, 230 are positioned between the bracket 200 and the housing 210.

A coil 240, preferably a copper coil, is provided to form an electromagnet to control the viscosity of the MR material. The coil is preferably surrounded on three sides by a flux carrier. In the illustrated embodiment, the surrounding flux carrier is provided in two pieces, including a first L-shaped flux carrier 250 and a second flux carrier 260. The present invention also contemplates a one-piece flux carrier or a flux carrier comprising more than two pieces. The illustrated first and second flux carriers 250, 260 preferably comprise a metal such as steel. The coil 240 and the flux carriers 250, 260 are preferably fixedly mounted to the housing 210.

A predetermined amount of MR material is shown to be provided in at least one band 300 located radially outwardly from the coil 240. The embodiment illustrated in FIG. 1 shows two bands 300, 300a of MR material.

The flux carriers 250, 260 are located in effective proximity to the coil, and are designed to channel the magnetic flux in a desired manner, preferably to make the magnetic field pass perpendicularly through the MR material, which maximizes the usable torque produced by the MR material 300, 300a.

A sleeve 320 is fixedly attached to the bracket 200 and is located radially outwardly from the MR band 300, such that it is interposed between the MR band 300 and the bracket 200. The sleeve 320 preferably comprises a metal such as steel.

Varying the viscosity of the MR material in the MR bands 300, 300a, varies the ability of the sleeve 320, the bracket 200, and the steering shaft 100 to rotate relative to the fixed-position MR bands 300, 300a. As a result, small-amplitude rotations of the steering shaft caused by nibble are prevented by applying a voltage to increase the viscosity of the MR material.

Although a single coil 240 with associated MR bands 300, 300a is shown in the embodiment of FIGS. 1 and 2, the present invention contemplates using multiple coils with associated MR bands.

Figure 3:
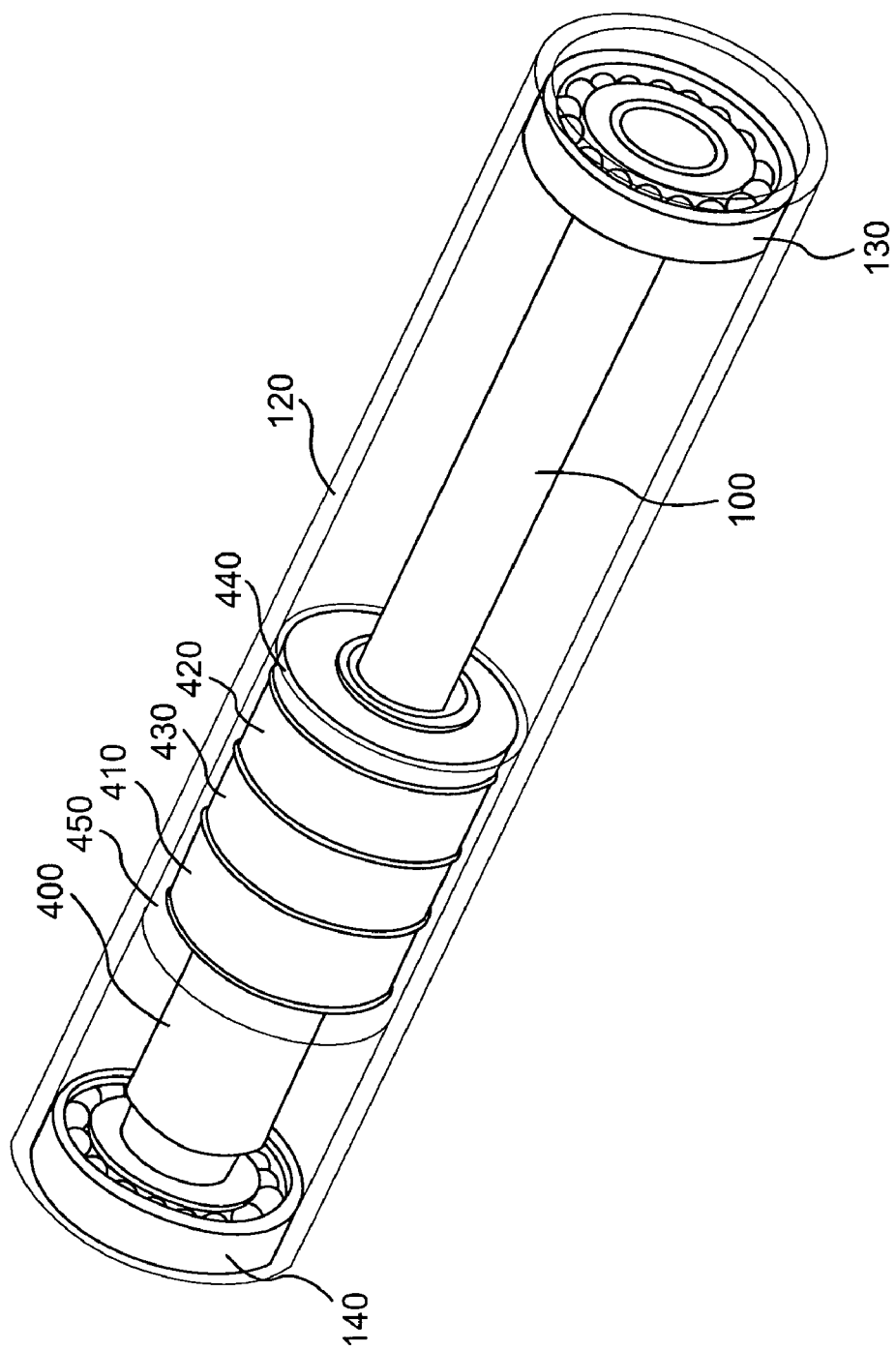
FIG. 3 illustrates a perspective view of another embodiment of the invention.
Figure 4:
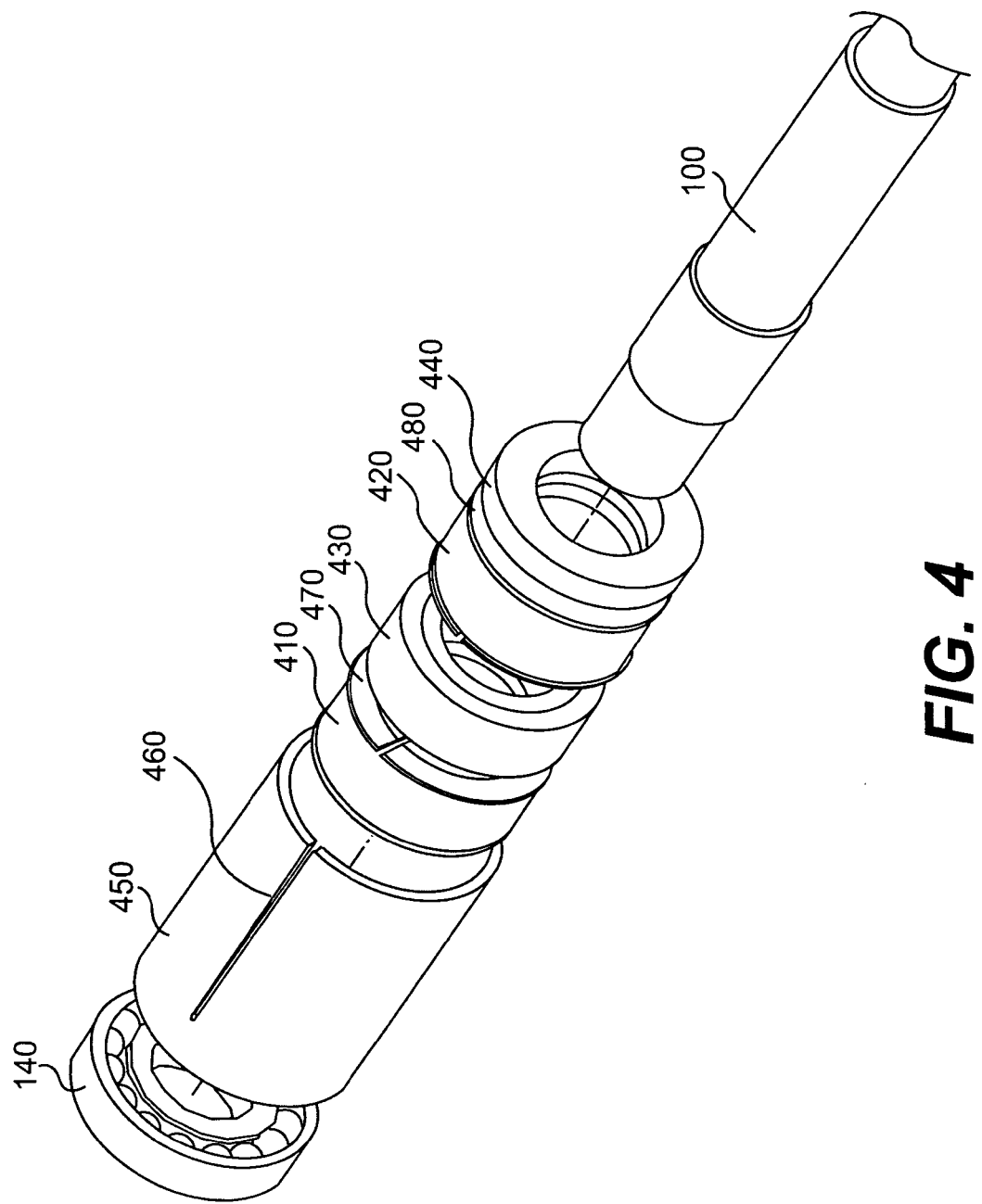
FIG. 4 illustrates an exploded view of the embodiment of FIG. 3.
Figure 5:
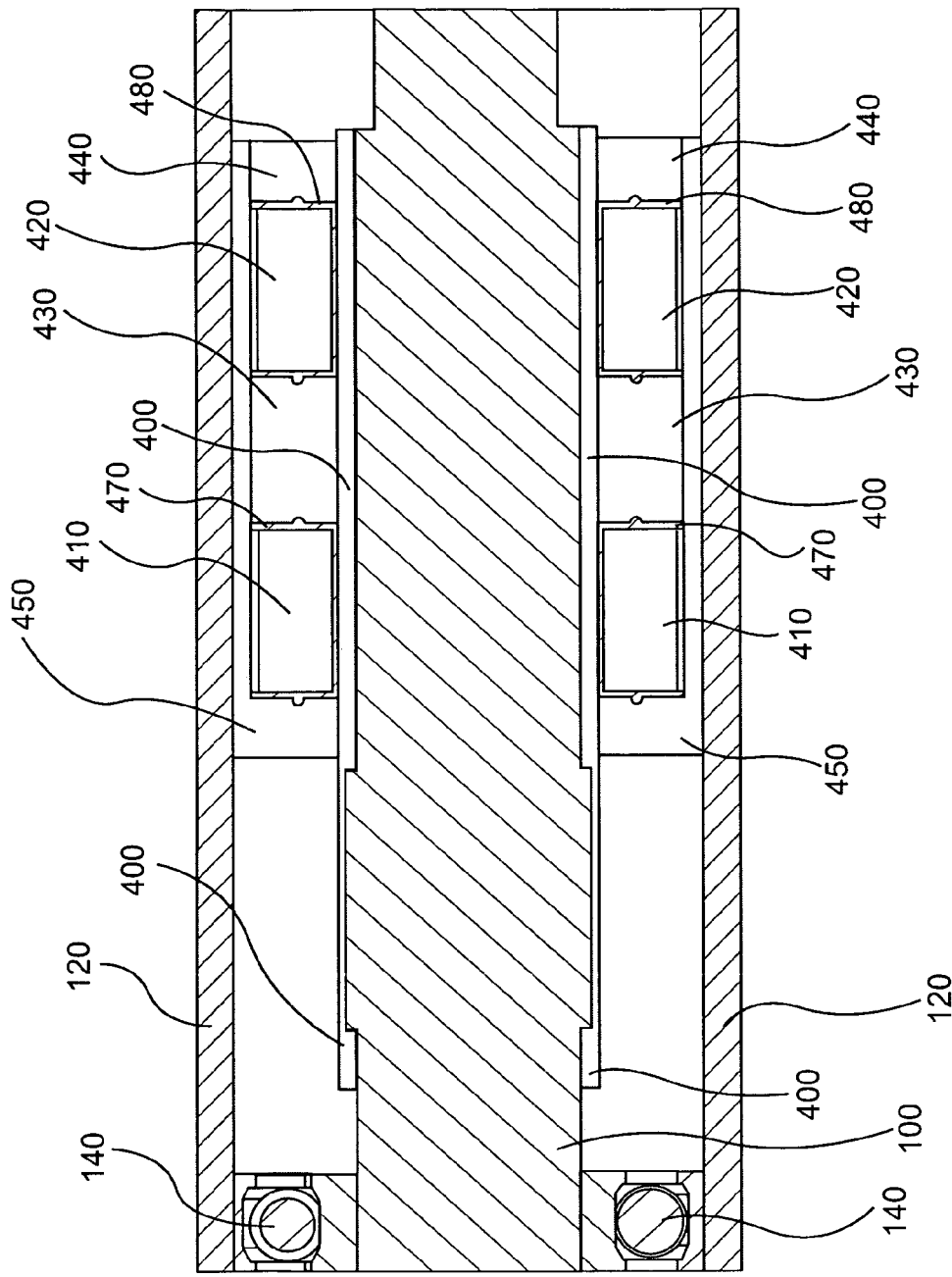
FIG. 5 illustrates a cross-sectional view of the embodiment of FIG. 3.

Another embodiment of the invention is illustrated in FIGS. 3-5. In this embodiment, the steering shaft 100 of the vehicle is shown within the steering column 120. To facilitate the necessary rotation of the steering shaft 100 within the steering column 120, bearings 130, 140, are provided at each end of the steering column 120. The steering column 120 is fixedly attached to the vehicle body to prevent its rotation.

FIGS. 3-5 show a single cylindrical band of MR material 400 surrounding the steering shaft 100, which preferably comprises a metal such as steel or iron to act as a flux path. A first coil 410 and a second coil 420, preferably both comprising copper, surround the MR band 400. A first flux carrier 430 is positioned between the first coil 410 and the second coil 420. A second flux carrier 440 is located adjacent the second coil 420, on the side opposite the first flux carrier 430. The first and second flux carriers 430, 440 are located in effective proximity to the coil, and preferably comprise a metal such as steel. A sleeve 450 preferably surrounds the first and second coils 410, 420, and the first and second flux carriers 430, 440. The sleeve 450 provides a return flux path for the coils 410, 420. The sleeve 450 preferably comprises a metal such as steel. A slit 460 or other opening may extend through the sleeve 450 to facilitate attachment of electrical wires to the coils 410, 420.

As best illustrated in FIG. 4, the first and second coils 410, 420, are preferably mounted on first and second bobbins 470, 480, respectively. The bobbins 470, 480 preferably comprise a plastic.

The assembly comprising the sleeve 450, the first and second coils 410, 420, and the first and second flux carriers 430, 440, is fixedly mounted to the steering column 120 so that it does not rotate with the steering shaft 100. The MR band 400 is disposed between the assembly and the steering shaft 100. Varying the viscosity of the MR material in the MR band 400 varies the ability of the steering shaft 100 to rotate relative to the fixed-position assembly. As a result, small-amplitude rotations of the steering shaft caused by nibble are prevented.

Although two coils 410, 420 and a single MR band 400 are illustrated in FIGS. 3-5, the present invention contemplates multiple bands of MR material, each with its own coil, or a single MR band with a single coil.

In a preferred embodiment, the device or method of the present invention is designed to ensure that a fault in the device's drive circuit, causing application of full voltage to the coils, does not cause excessive steering effort for the driver. This can be achieved by, for example, selecting the geometry of the magnetic circuit and the characteristics of the MR material such that when the electromagnet (the coil(s) connected to a power source) is at maximum field strength, i.e., any excess voltage is applied, there is no significant increase in steering wheel turning effort. Thus, nibble amplitude is damped without having a negative effect on the driver's ability to safely maneuver the vehicle.

Further, the device is preferably designed such that, with the electromagnet turned off so that no voltage is applied to the coil, there is no measurable increase in steering wheel turning effort compared to when the MR damper is not installed. This assures that the device has no affect on vehicle handling when not actively employed.

It is necessary to retain the MR material in place between the sleeve and the coil (FIGS. 1 and 2) or between the coils and the shaft (FIGS. 3-5). To eliminate the need for sealing the MR material, the MR material can be embedded into a sponge, foam, fabric, gauze, or other open-network carrier. One way to embed MR material into open-network carrier is to squeegee it into the carrier. Using a squeegee minimizes air entrapment, because the carrier is compressed and then the material is drawn into the voids. A more economical production method may include placing spools of open-network carrier into a tank of MR material with rollers, preferably in the tank, that compress the open-network carrier so that MR material is drawn into the void after compression. The present invention contemplates using any known method to suitably embed MR material into an open-network carrier.

In a preferred embodiment of the invention, the MR material utilized in the invention is thixotropic and has a paste-like consistency when a magnetic field is not applied. When a magnetic field is applied, the material behaves as a weak solid material with viscoplastic behavior.

The MR material is preferably based on silicone oil, hydrocarbon, or other suitable carrier with sufficient viscosity that seals are not needed to retain the MR material. Preferably, the MR material includes a high concentration of magnetizable particles such as carbonyl iron particles or stainless steel particles, or other alloys such as Ni, NiFe, etc. The magnetizable particles are mixed into the carrier fluid. Additional additives may be included, such as surfactants (improve dispersion/separation between particles), friction modifiers, anti-oxidants, and perhaps magnetizable powders or fumed silica, which modify viscosity, as does the chemistry of the carrier fluid. The MR fluid preferably has a viscosity that is grease-like, so that seals are not needed to retain the MR fluid. In fact, the present invention contemplates MR fluid having a viscosity thick enough that neither an open-network carrier nor seals are needed to retain the MR fluid within the device.

The MR damping device of the present invention provides vibration damping over a large range of frequencies and amplitudes, while minimizing manufacturing and assembly costs. In addition, the MR damping device of the present invention also minimizes the amount of power utilized by the damping system.

In use, the driver applies a force to the steering wheel and the steering shaft to overcome the inertial force applied by the MR fluid when activated. The viscosity of the MR fluid increases as a voltage is supplied to a saturation point of preferably 0.8 Tesla of magnetic field. The saturation point of the MR fluid depends on the ratio of the magnetic particles to the carrier fluid, and the type of magnetic particle that is used. In an embodiment of the invention, the maximum damping torque applied by the MR fluid to the steering column is small enough to remove nibble but be imperceptible to the driver.

While various embodiments of the present invention have been described above, it should be understood that they have been presented by way of example only and not limitation. It will be understood by those skilled in the art that various changes in form and details may be made therein without departing from the spirit and scope of the invention as defined in the appended claims. For example, the present invention could also be arranged such that the location of the MR material 400 and the sleeve 450 in the embodiment of FIGS. 3-5 could be reversed, so that the MR material is located at the outer circumference of the steering column and the sleeve is located at the more inward location. Thus, the breadth and scope of the present invention should not be limited by any of the above-described exemplary embodiments, but should be defined only in accordance with the following claims and their equivalents.

What is claimed is:

1. A damping device for use with a steering shaft having a bracket non-rotatably mounted thereto, the damping device comprising:
    a magnetorheological material embedded in an open-network carrier and indirectly in contact with the steering shaft;
    a coil arranged in effective proximity to the magnetorheological material;
    flux carriers located at least on first and second opposing sides of the coil; and
    a body indirectly in contact with the steering shaft through the magnetorheological material, and which does not rotate with the steering shaft,
    wherein the magnetorheological material is located on a third side of the coil, between the coil and the bracket, and wherein a voltage applied to the coil to activate the magnetorheological material increases a viscosity of the magnetorheological material to inhibit relative rotation of the steering shaft and the body.

2. The damping device of claim 1, wherein the flux carriers are located in effective proximity to the coil.

3. The damping device of claim 2, wherein the flux carriers are positioned relative to the coil to make a magnetic field pass perpendicularly through the magnetorheological material.

4. The damping device of claim 3, further comprising a sleeve extending at least partially around the steering shaft that acts as a flux return path.

5. The damping device of claim 4, wherein the sleeve is positioned relative to the coil and the flux carriers to make the magnetic field pass perpendicularly through the magnetorheological material.

6. The damping device of claim 1, wherein the magnetorheological material comprises a cylindrical band surrounding the steering shaft.

7. The damping device of claim 6, wherein the magnetorheological material comprises magnetizable particles suspended in a suitable carrier.

8. The damping device of claim 1, wherein the body is fixed external to the steering shaft so that it does not rotate with the steering shaft.

9. A damping device for use with a steering shaft having a bracket non-rotatably mounted thereto, the damping device comprising:
    a magnetorheological material indirectly in contact with the steering shaft, and having a viscosity such that seals are not needed to contain the magnetorheological material;
    a coil arranged in effective proximity to the magnetorheological material;
    flux carriers located at least on first and second opposing sides of the coil; and
    a body indirectly in contact with the steering shaft through the magnetorheological material, and which does not rotate with the steering shaft,
    wherein the magnetorheological material is located on a third side of the coil, between the coil and the bracket, and
    wherein a voltage applied to the coil to activate the magnetorheological material increases a viscosity of the magnetorheological material to inhibit relative rotation of the steering shaft and the body.

10. The damping device of claim 9, wherein the flux carriers are located in effective proximity to the coil.

11. The damping device of claim 10, wherein the flux carriers are positioned relative to the coil to make a magnetic field pass perpendicular through the magnetorheological material.

12. The damping device of claim 11, further comprising a sleeve extending at least partially around the steering shaft that acts as a flux return path.

13. The damping device of claim 12, wherein the sleeve is positioned relative to the coil and the flux carriers to make the magnetic field pass perpendicular through the magnetorheological material.

14. The damping device of claim 13, wherein the magnetorheological material comprises magnetizable particles suspended in a suitable carrier.

15. The damping device of claim 9, wherein the magnetorheological material comprises a cylindrical band surrounding the steering shaft.

16. The damping device of claim 9, wherein the body is fixed external to the steering shaft so that it does not rotate with the steering shaft.

17. A damping device for use with a steering shaft having a bracket non-rotatably mounted thereon, the damping device comprising:
    a housing at least partially surrounding the steering shaft that does not rotate with the steering shaft;
    a coil and flux carriers fixedly attached to the housing at a radially outer position such that the flux carriers are located at least on first and second opposing sides of the coil; and
    a magnetorheological material extending between the coil and the bracket,
    wherein a voltage applied to the coil to activate the magnetorheological material increases the viscosity of the magnetorheological material to inhibit rotation of the steering shaft, and wherein seals are not needed to contain the MR material.

18. The damping device of claim 17, wherein the bracket comprises a disc-like bracket fixedly mounted around the steering shaft and a cylindrical sleeve fixedly mounted to the bracket at a radially outer position, the bracket and sleeve rotating with the steering shaft, wherein the magnetorheological material extends between the coil and the cylindrical sleeve.

19. The damping device of claim 17, wherein the coil and flux carriers are positioned to make a magnetic field pass perpendicularly through the magnetorheological material.

20. A method for damping vibrations in a steering shaft, comprising:
    embedding a magnetorheological material in an open-network carrier and indirectly placing the magnetorheological material in contact with the steering shaft;
    arranging a coil in effective proximity to the magnetorheological material and such that the magnetorheological material is located on a first side of the coil;
    locating flux carriers on at least first and second opposing sides of the coil;
    providing a body that does not rotate with the steering shaft, and which is in contact with the steering shaft through the magnetorheological material; and
    applying a voltage to the coil to activate the magnetorheological material, increasing a viscosity of the magnetorheological material to inhibit relative rotation between the steering shaft and the body.

* * * * *